United States Patent [19]

Smith

[11] Patent Number: 5,418,999
[45] Date of Patent: May 30, 1995

[54] MOUSE CLEANER

[75] Inventor: Dale L. Smith, Spring, Tex.

[73] Assignee: Preston-Smith Technologies, Inc., Houston, Tex.

[21] Appl. No.: 216,642

[22] Filed: Mar. 22, 1994

[51] Int. Cl.⁶ .............................................. A46B 9/00
[52] U.S. Cl. .................................. 15/106; 15/160; 15/200; 15/206
[58] Field of Search ............... 15/106, 160, 164, 200, 15/206

[56] References Cited

U.S. PATENT DOCUMENTS

| | | | |
|---|---|---|---|
| 1,678,943 | 7/1928 | Jackson | 15/206 |
| 1,806,519 | 5/1931 | Cave | 15/206 |
| 1,806,520 | 5/1931 | Cave | 15/206 |
| 2,139,593 | 12/1938 | Kohler | 15/106 |
| 2,194,916 | 3/1940 | Somers | 15/206 |
| 2,279,209 | 4/1942 | Snyder | 15/206 |
| 2,897,525 | 8/1959 | Goodwin | 15/206 |
| 4,030,199 | 6/1977 | Russell | 15/106 |
| 4,762,133 | 8/1988 | Bayne | 15/164 |
| 4,873,992 | 10/1989 | Bayne | 15/206 |
| 5,161,555 | 11/1992 | Cansler | 15/206 |
| 5,253,386 | 10/1993 | La Londe | 15/164 |
| 5,297,310 | 3/1994 | Cox | 15/206 |

FOREIGN PATENT DOCUMENTS

| | | | |
|---|---|---|---|
| 475496 | 5/1915 | France | 15/106 |
| 508669 | 10/1920 | France | 15/164 |
| 1038757 | 5/1953 | France | 15/206 |
| 2621792 | 4/1989 | France | 15/167.1 |
| 2349580 | 4/1975 | Germany | 15/106 |
| 24259 | of 1898 | United Kingdom | 15/206 |
| 324279 | 1/1930 | United Kingdom | 15/206 |
| 871731 | 6/1961 | United Kingdom | 15/206 |

Primary Examiner—David A. Scherbel
Assistant Examiner—Randall E. Chin
Attorney, Agent, or Firm—John R. Casperson

[57] ABSTRACT

There is disclosed a brush comprising a handle and at least one brush insert having a bend which is useful for cleaning the rolling contacts in a computer mouse. The inserts have radially protruding bristles and are bent to facilitate cleaning the rollers. Preferably, the handle has a hooked brush extending from one end and a bent brush extending from the other end.

10 Claims, 1 Drawing Sheet

MOUSE CLEANER

BACKGROUND OF THE INVENTION

A computer mouse is constructed of a housing having a removable bottom cover with a circular port. A ball inside of the housing partially protrudes through the port and rolls along a working surface, such as a mouse pad, when operated by the user. The ball is usually constructed of rubber coated metal. Rolling contacts inside the housing contact the ball and send electrical signals to the computer representative of the movements of the ball.

Over time, the ball picks up grime which is transferred to the rolling contacts. This interferes with functioning of the contacts to reliably track the movements of the ball. The user is usually unaware that this is occurring, because the contacts are out of sight. The mouse becomes difficult to operate and most users either place the blame on the computer or replace the mouse. Knowledgeable users sometimes try to clean the contacts with pipe cleaners, which leave lint behind, or spray solvents, which are messy. A device for conveniently cleaning a computer mouse is much needed.

OBJECTS OF THE INVENTION

It is an object of this invention to provide a device which is well suited for cleaning the rolling contacts in a computer mouse.

SUMMARY OF THE INVENTION

In one embodiment of the invention, there is provided a brush comprising a handle and a brush insert. The handle is elongated and has a longitudinal axis, a first end and a second end. A generally longitudinally extending borehole extends at least partially through the handle from the first end of the handle. The brush insert has a first end, a first straight section positioned adjacent to the first end, a second end, and a second straight section positioned adjacent to the second end. The first straight section is connected to the second straight section by a bent section. The first straight section forms an angle with the second straight section in the range of from about 152° to about 172°. The first end of the brush insert is positioned in the borehole with a first portion of the first straight section extending from the borehole. The bent section is positioned at a spaced apart position from the first end of the handle. The brush is highly suited for cleaning upper and lower surfaces of the rolling contacts inside of a computer mouse.

In further embodiment of the invention, there is provided a brush comprising a handle and a brush insert. The handle is elongated and has a longitudinal axis, a first end, a second end, and a generally longitudinally extending borehole extending at least partially through the handle from the second end of the handle. The brush insert has a first end, a first straight section positioned adjacent to the first end, a second end, and a second straight section positioned adjacent to the second end. The first straight section is connected to the second straight section by a bent section. The first straight section forms an angle with the second straight section in the range of from about 18° to about 46°. The first end of the brush insert is positioned in the borehole with a first portion of the first straight section extending from the borehole. The bent section is positioned at a spaced apart position from the second end of the handle. The brush is highly suited for cleaning the front and back surfaces of the rolling contacts inside of a computer mouse.

In another embodiment of the invention, there is provided a cleaning brush for a computer mouse. The cleaning brush comprises a handle, a first brush insert and a second brush insert. The handle is elongated and has a longitudinal axis, a first end, and a second end. A generally longitudinally extending first borehole extends at least partially through the handle from the first end of the handle. A generally longitudinally extending second borehole extends at least partially through the handle from the second end of the handle. The first brush insert has a first end and a second end. A mounting portion of the insert is adjacent to the first end and a brush portion of the insert is adjacent to the second end. The mounting portion of the first brush insert is positioned in the first borehole. The brush portion of the first brush insert extends from the borehole. The first brush insert has a bend which is positioned at a spaced apart position from the first end of the handle. The second brush insert has a first end and a second end. A mounting portion of the insert is adjacent to the first end and a brush portion of the insert is adjacent to the second end. The mounting portion of the second brush insert is positioned in the second borehole. The brush portion of the second brush insert extends from the borehole. The second brush insert has a bend is which is positioned at a spaced apart position from the first end of the handle. The tool provides two working ends each of which is highly suited for cleaning the rolling contacts in a computer mouse.

BRIEF DESCRIPTION OF THE DRAWINGS

The FIGURE pictorially shows the brush according to one embodiment of the invention.

DETAILED DESCRIPTION OF THE PREFERRED EMBODIMENTS

Figure 1:
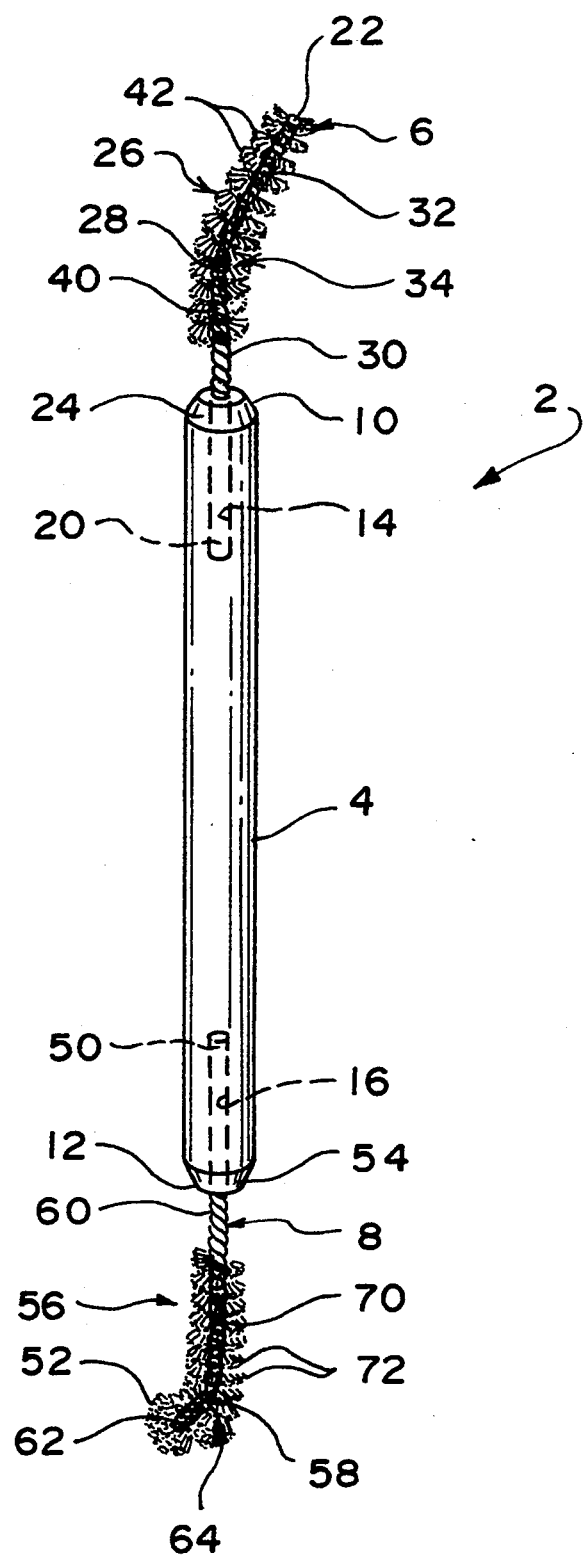

In one embodiment of the invention, there is provided a brush designated generally by the numeral 2. The brush 2 is highly suited for cleaning a computer mouse.

The brush 2 comprises a handle 4 and at least one brush insert 6 and/or 8 having a bend. The brush insert 6 will be referred to as the first brush insert. The brush insert 8 will be referred to as the second brush insert. Preferably, the brush comprises both inserts, although a serviceable device can be constructed using either of them. When the brush is constructed with both inserts, they are preferably bent in generally radially opposite directions with respect to the longitudinal axis of the handle.

The handle 4 is elongated and has a longitudinal axis, a first end 10, and a second end 12. At least one generally longitudinally extending borehole 14 and/or 16 extends at least partially through the handle. The borehole 14, referred to the first borehole, extends from the first end 10 of the handle. The borehole 16, referred to as the second borehole, extends from the second end 12 of the handle. If desired, the boreholes could extend all the way through the handle, but it is preferred that they extend only partially through so that the brush inserts will seat on the bottom of the borehole for reliable placement. If desired, the handle could be molded around the brush inserts and the description just made should be construed to cover that alternative. However, it is presently preferred to drill the boreholes and cement the inserts into position.

The handle 4 can be formed from a wide variety of materials, such as plastic, wood or metal. However, plastic is preferred. For best appearance, a clear or translucent plastic, such as a polyacrylate is preferred. Generally speaking, the handle should be small enough so that it can be easily hand held. For example, a handle formed from a generally cylindrical plastic rod having a diameter in the range of from about 0.5 cm to about 1.3 cm and a length of from about 7 to about 13 cm is highly suitable. A handle having a diameter of about 0.9 cm and a length of about 10 cm has been tested with good results. It is preferred to round the ends of the handles.

The first brush insert 6 has a first end 20 and a second end 22. A mounting portion 24 of the insert is adjacent to the first end and a brush portion 26 of the insert is adjacent to the second end. The mounting portion of the first brush insert is positioned in the first borehole 14. The brush portion of the first brush insert extends from the borehole, preferably in a generally axial direction.

The first brush insert 6 has a bend 28 positioned at a spaced apart position from the first end 10 of the handle. Preferably, the brush insert has a first straight section 30 positioned adjacent to the first end 20 and a second straight section 32 positioned adjacent to the second end 22. The first straight section 30 is connected to the second straight section 32 by a bent section 34. Because of the bent section the first straight section forms an angle with the second straight section. An angle in the range of from about 152° to about 172° has been tested with good results. It is preferred that the angle be about 162°. The first end 20 of the brush insert 6 is positioned in the borehole 14 with a first portion of the first straight section extending from the borehole. The bent section 34 is positioned at a spaced apart position from the first end 10 of the handle 4. Generally, the bend is positioned between about 1 and about 3 cm from the first end of the handle. For example, a spacing of about 2 cm has been used with good results. Generally speaking, the second straight section will have an overall length in the range of from about 1 cm to about 3 cm. A second straight section having a length of about 2 cm has been used with good results.

Preferably, the brush insert 6 is formed from a twisted wire core 40 having generally radially protruding bristles 42 along the second straight section 32 and the bent section 34. The wire core should be stiff enough to clean the rolling contacts and not easily bend during use but yet thin enough to facilitate inserting it by the rollers. A wire core formed from a doubled strand of twisted stainless steel wire having a wire diameter of in the range of from about 0.10 cm to about 0.14 cm has been tested with good results. Preferably, the strand of wire is formed from stainless steel wire having a diameter of about 0.12 cm and forms a loop at the second end 22 of the brush insert.

The generally radially protruding bristles are most preferably formed from nylon filaments having a diameter in the range of from about 0.015 cm to about 0.025 cm and a length of from about 0.4 cm to about 0.8 cm. The bristles are preferably arranged to spiral along the wire core. A bristle loading in the range of from about 0.2 grams to about 0.4 grams is expected to provide good results. Most preferably, the bristles have a diameter of about 0.02 cm, a length of about 0.6 cm and are loaded onto the brush insert in a mass of about 0.3 g.

The second brush insert 8 has a first end 50 and a second end 52. A mounting portion 54 of the insert is adjacent to the first end and a brush portion 56 of the insert is adjacent to the second end. The mounting portion of the second brush insert is positioned in the second borehole 14. The brush portion of the second brush insert extends from the borehole.

The second brush insert 8 has a bend 58 positioned at a spaced apart position from the second end 12 of the handle. Preferably, the brush insert has a first straight section 60 positioned adjacent to the first end 50 and a second straight section 62 positioned adjacent to the second end 52. The first straight section 60 is connected to the second straight section 62 by a bent section 64. Because of the bent section the first straight section forms an angle with the second straight section. An angle in the range of from about 18° to about 46° has been tested with good results. It is preferred that the angle be about 32°. It is also most preferred that the bend be radiused along an inside radius of about 0.14 cm. The first end 50 of the brush insert 8 is positioned in the borehole 16 with a first portion of the first straight section extending from the borehole. The bent section 64 is positioned at a spaced apart position from the second end 12 of the handle 4. Generally, the bend is positioned between about 1 and about 3 cm from the second end of the handle. For example, a spacing of about 2 cm has been used with good results. Generally speaking, the second straight section will have an overall length in the range of from about 0.5 cm to about 1.5 cm. A second straight section having a length of about 0.5 cm has been used with good results.

Preferably, the brush insert 8 is formed from a twisted wire core 70 having generally radially protruding bristles 72 along the second straight section 62 and the bent section 64. The characteristics of the wire core and the bristles are preferably as previously described, with the wire core forming a loop at the second end 62 of the insert.

To use the brush, the mouse is turned upside down and the bottom cover is removed, along with the ball. This makes the rollers easily accessible for cleaning by application of the brush. The bent insert can be used to clean the top and bottom sides of the rollers. The hook insert can be used to clean the inner and outer sides of the rollers.

While a particularly preferred embodiment of the invention has been described herein, the invention is not to be construed as so limited, except to such extent the limitations are found in the claims.

I claim:

1. A cleaning brush for a computer mouse comprising an elongated handle having a longitudinal axis, a first end, a second end, a generally longitudinally extending first borehole extending at least partially through the handle from the first end of the handle and a generally longitudinally extending second borehole extending at least partially through the handle from the second end of the handle;

a first brush insert having a first end, a first straight section positioned adjacent the first end and defining a mounting portion, a second end, a second straight section positioned adjacent the second end and defining a brush portion the mounting portion of the first brush insert being positioned in the first borehole, the brush portion of the first brush insert extending from the borehole, said first brush insert having a bend which is positioned at a spaced apart position from the first end of the handle; and a second brush insert having a first end, a first straight section positioned adjacent the first end and defining a mounting portion, a second end, a second straight section positioned adjacent the second end and defining a brush portion the mounting portion of the second brush insert being positioned in the second borehole, the brush portion of the second brush insert extending from the borehole, said second brush insert having a bend which is positioned at a spaced apart position from the second end of the handle;

wherein each brush insert is formed from a twisted wire core having generally radially protruding bristles positioned on the brush portion of the brush insert;

the wire core comprises a doubled strand of twisted stainless steel wire having a wire diameter in the range of from about 0.10 cm to about 0.14 cm, said strand of wire forming a loop at the second end of each brush insert:

the bend in the first brush insert forms an angle in the range of from about 152° to about 172°;

the bend in the second brush insert forms an angle in the range of from about 18° to about 46°, the bend in the first brush insert is positioned in the range of from about 1 to about 3 cm from the first end of the handle;

the bend in the second brush insert is positioned in the range of from about 1 to about 3 cm from the second end of the handle;

the bristles are formed from nylon filaments having a diameter in the range of from about 0.015 cm to about 0.025 cm and a length of from about 0.4 cm to about 0.8 cm.; and the brush inserts are bent in generally radially opposite directions with respect to the longitudinal axis of the handle.

2. A cleaning brush for a computer mouse as in claim 1 wherein the second straight section of the first brush insert has an overall length in the range of from about 1 cm to about 3 cm and wherein the radially protruding bristles have a combined mass in the range of from about 0.2 grams to about 0.4 grams and are spirally arranged on the twisted wire core.

3. A cleaning brush for a computer mouse as in claim 2 wherein the elongated handle is formed from a generally cylindrical plastic rod having a diameter in the range of from about 0.5 cm to about 1.3 cm and a length of from about 7 cm to about 13 cm.

4. A cleaning brush for a computer mouse as in claim 3, wherein the first end of the elongated handle is rounded.

5. A cleaning brush for a computer mouse as in claim 4 wherein the first straight section of the first brush insert is connected to the second straight section of the first brush insert at an angle of about 162°, the wire has a diameter of about 0.12 cm, the bristles have a diameter of about 0.02 cm, and a length of about 0.6 cm and a combined mass of about 0.3 g, the bend in the first brush insert is positioned about 2 cm from the first end of the elongated handle, and the elongated handle has a diameter of about 0.9 cm and a length of about 10 cm.

6. A cleaning brush for a computer mouse as in claim 1 wherein the second straight section of the second brush insert has an overall length in the range of from about 0.5 cm to about 1.5 cm and wherein the radially protruding bristles have a combined mass in the range of from about 0.2 grams to about 0.4 grams and are spirally arranged on the twisted wire core.

7. A cleaning brush for a computer mouse as in claim 6 wherein the elongated handle is formed from a generally cylindrical plastic rod having a diameter in the range of from about 0.5 cm to about 1.3 cm and a length of from about 7 cm to about 13 cm.

8. A cleaning brush for a computer mouse as in claim 7 wherein the bent section of the second brush insert is positioned about 2 cm from the second end of the elongated handle.

9. A cleaning brush for a computer mouse as in claim 8 wherein the second end of the elongated handle is rounded.

10. A cleaning brush for a computer mouse as in claim 9 wherein the first straight section of the second brush insert is connected to the second straight section of the second brush insert to form an angle of about 32°, the wire has a diameter of about 0.12 cm, the bristles have a diameter of about 0.02 cm, a length of about 0.6 cm and a combined mass of about 0.3 g, the bent section is positioned about 2 cm from the second end of the elongated handle, and the elongated handle has a diameter of about 0.9 cm and a length of about 10 cm.

* * * * *